Nov. 7, 1933.  K. W. CONNOR  1,934,226
METHOD OF REMOVING DUST WHILE MACHINING CYLINDERS
Filed April 3, 1933  2 Sheets-Sheet 1
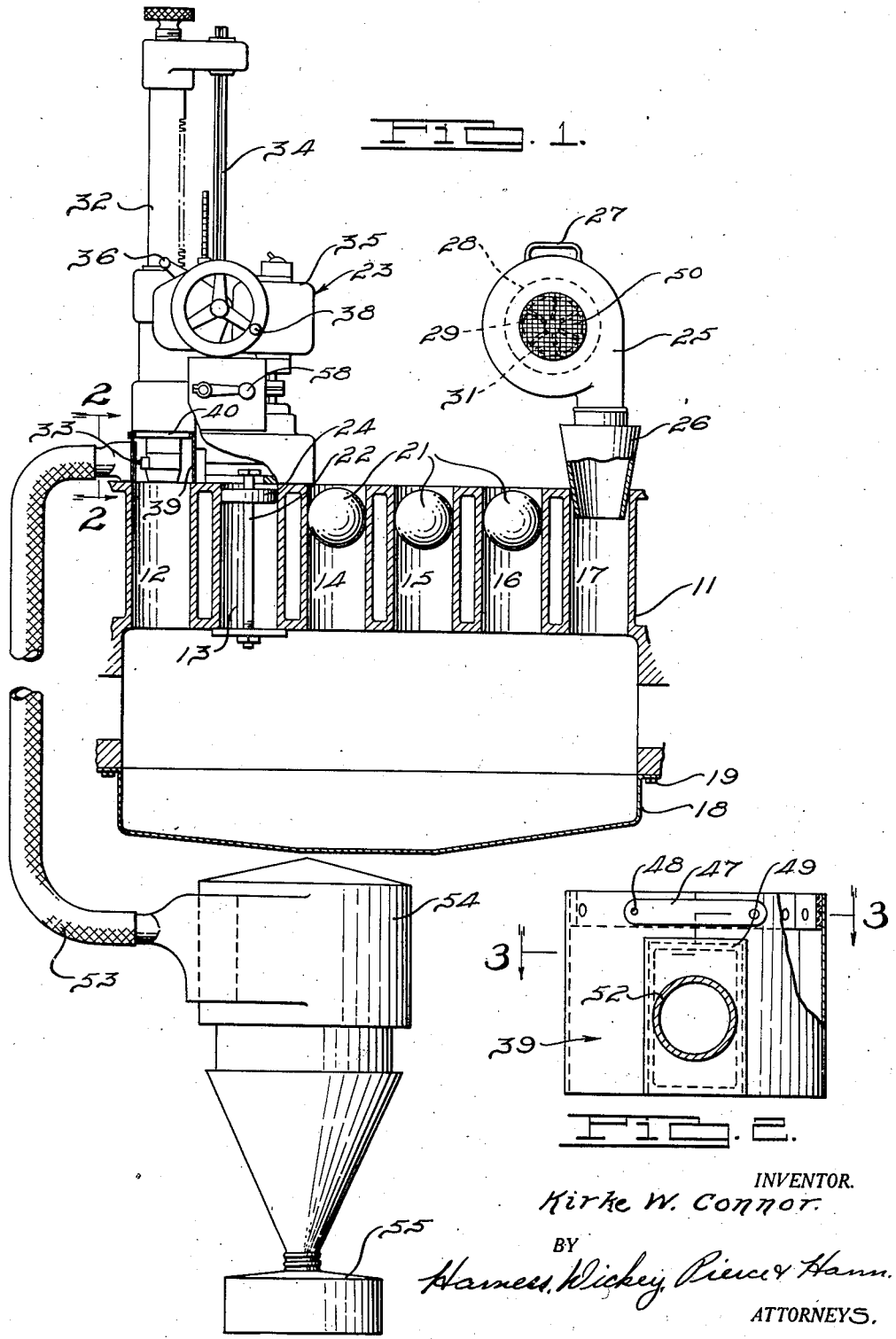
INVENTOR.
*Kirke W. Connor.*
BY
*Harness, Dickey, Pierce & Hann.*
ATTORNEYS.

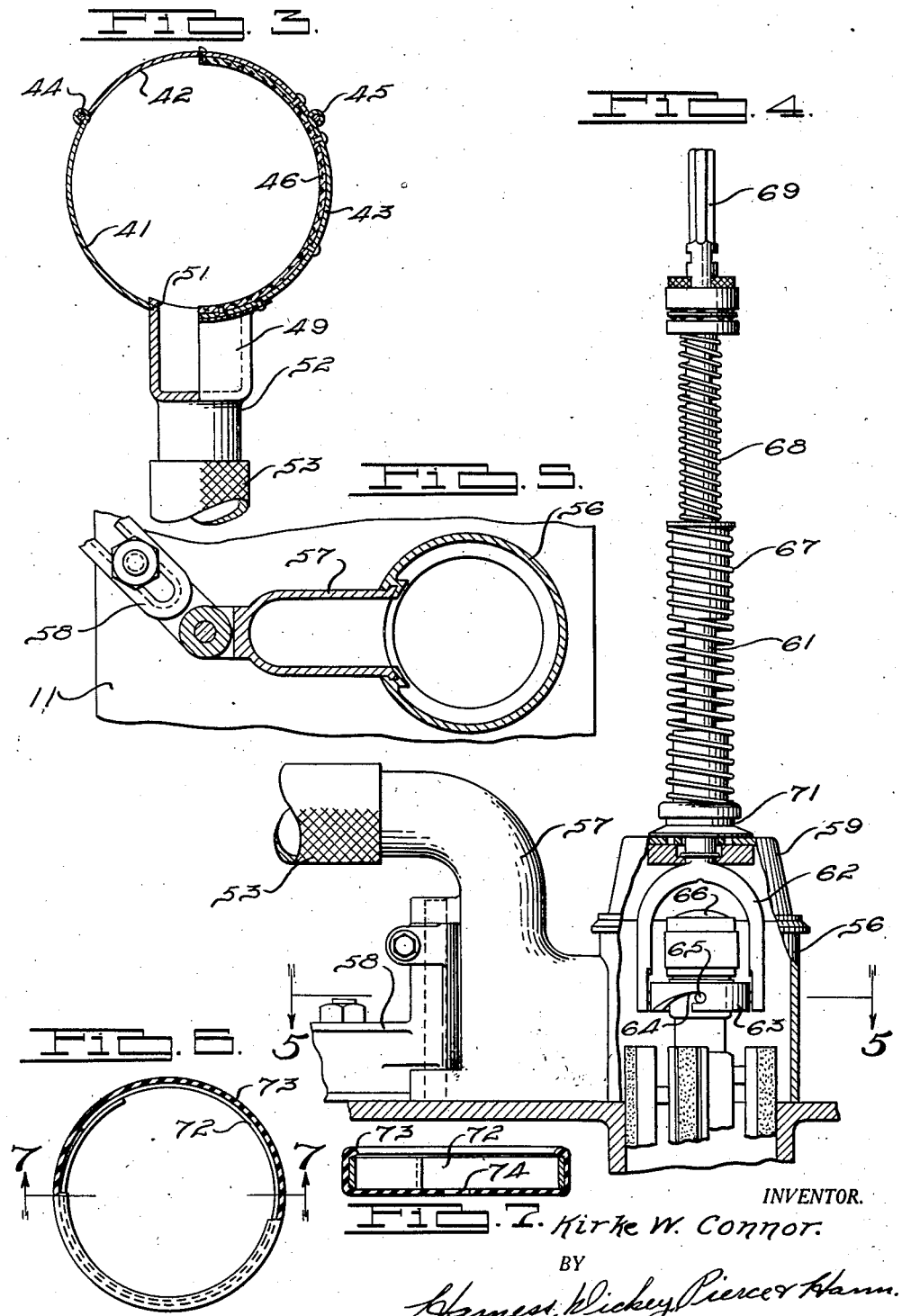

Patented Nov. 7, 1933

1,934,226

UNITED STATES PATENT OFFICE 1,934,226

METHOD OF REMOVING DUST WHILE MACHINING CYLINDERS

Kirke W. Connor, Detroit, Mich., assignor to Micromatic Hone Corporation, a corporation of Michigan Application April 3, 1933. Serial No. 664,225

13 Claims. (Cl. 51—278)

My invention relates to method and means for scavenging the residue produced in a machining operation and particularly to a method and means for retaining the inner surface of an automotive engine clean and free from residue produced in a machining operation when boring, grinding and the like, through a system of pressure and air flow within the engine and outwardly of the cylinder in which the tool is operating.

Attempts have been made heretofore to employ vacuum as a scavenging means for the residue produced during the machining operation of cylinders of engines and otherwise but, in view of the small pressures developed and the small amount of air flow, little success was attained in preventing the residue from dropping within the engine.

My present invention relates to a method and means for producing a much greater flow of air about the tool by direct pressure rather than by a suction action, the amount of air flow and the pressure being materially greater. When the machined article is an engine block which is herein illustrated and will be described, the block is substantially sealed by the attachment of the pan and the plugging of the cylinders other than the one to be ground. An air propelling means in the nature of a blower is attached to an opening, preferably one of the cylinders. In this manner, a large volume of air is supplied to the area within the engine, some of which may escape about the cracks thereof, sufficient volume and pressure being supplied so that the major portion of the air is forced out of the cylinder which is machined.

The advantage of this system over a vacuum system will be readily apparent since the outflow of air will tend to clean the inside of the surface of the engine and will prevent any particle entering the inner area. This is directly contrary to the operation of a vacuum system, wherein the air sucked from the cylinder to be ground, must enter the inner area of the block through adjacent cylinders or through the bottom, when the pan is removed. The present system eliminates any possibility whatsoever of dust, grime and machining residue from entering the engine block. The air introduced into the block by the blower may be filtered or strained in any well known manner. The air leaving the cylinder may be conducted exteriorly of the building or preferably may be led into an air arrester where the residue is deposited and the air cleaned.

Accordingly, the main objects of my invention are; to provide a method and means for preventing the residue produced when cylinders are machined from dropping into the engine block; to provide a blower which is attachable to an opening of an engine block to introduce a large volume of air therein to have it flow upwardly out of the cylinder being machined; to provide a connector in extension of the cylinder for conducting the air and residue from the engine block; to provide means for substantially sealing the cylinders not being operated upon against an outflow of air; to provide a method whereby the application of air to the inner surface of an engine block prevents any dust, grime and residue from falling therein during the time the block is being machined or otherwise operated on; and, in general, to provide a method and means for scavenging the residue produced during a machining operation, which is simple in attachment, economical of employment and positive in operation.

Other objects and features of novelty of my invention will be either specifically pointed out or will become apparent when referring, for a better understanding of my invention, to the following description taken in conjunction with the accompanying drawings, wherein:

Figure 1 is a view, partly in section and partly in elevation, of an engine block having a blower system employed therein which embodies features of my invention.

Fig. 2 is an enlarged sectional view of the structure illustrated in Fig. 1, taken on the line 2—2 thereof, Fig. 3 is a sectional view of the structure illustrated in Fig. 2, taken on the line 3—3 thereof, Fig. 4 is a broken view, partly in section and partly in elevation, of a honing tool employed with the device illustrated in Fig. 1, in lieu of the boring bar illustrated therein, Fig. 5 is a sectional view of the structure illustrated in Fig. 4, taken on the line 5—5 thereof, Fig. 6 is a plan view, partly in section, of a sealing element which may be employed to seal the cylinders, and Fig. 7 is a sectional view of the structure illustrated in Fig. 6, taken on the line 7—7 thereof.

In Fig. 1 I have illustrated an engine cylinder block 11 having cylinders 12, 13, 14, 15, 16 and 17, and containing the crankshaft (not shown)

and having the pan 18 loosely bolted thereon by several bolts 19. In cylinders 14, 15 and 16 I have illustrated rubber balls 21 inserted therein to substantially seal the walls of the cylinders. The balls are preferably made of sponge rubber to be extremely resilient and contractable. In cylinder 13 I have illustrated a clamping rod 22 for a cutting machine 23 for clamping the machine to the block. A sealing element 24 extends over the rod 22 and engages the side of the cylinder 13 and will be described more fully hereinafter.

The cylinder 17 has a blower unit 25 supported thereon, preferably by a truncated conical nozzle 26 which is tapered to fit any size of cylinder employed in the automotive passenger car art. The blower is preferably made of aluminum so as to be light of weight and is provided with a handle 27 by which it may be carried and positioned in the cylinders or otherwise on the engine block. A motor 28 drives a propeller 29 which draws air into an opening 31 and forces it through the nozzle 26 into the engine block. The opening 31 may be covered by a strainer 50 for removing grit and particles from the air before being introduced within the block. When the cylinders 13, 14, 15 and 16 are sealed and the pan 18 is attached to the block, the blower 25 will build up a pressure of air within the cylinder and the major portion of the air will be vented through cylinder 12, which is the one to be machined. It is to be understood that after the machining of the cylinder 12 this cylinder will be closed by a sealing element 21 or 24 and a cylinder to be machined will then be opened so that the air will flow therethrough. After the first five cylinders have been machined, the blower will be moved to one of the machined cylinders and the cylinder 17 will then be machined.

The machine 23 herein shown, is of the boring type having a downwardly movable arbor 32 provided with a boring tool 33 on its end which is driven in rotation through a shaft 34 during the downward movement of the bar 32. A motor 35 is employed for driving the rod 34 in timed relation to the driving of the arbor 32 downwardly through the cylinder. Suitable control handles 36, and 38 are employed for regulating the relative speeds and the operation of the arbor 32 and tool 33.

After the machine 23 is clamped to the block a collar 39 is disposed about the ends of the arbor 32 sealed to the shoulder 40 of the machine and in extension of the cylinder 12. The collar 39 is preferably made of three sections 41, 42 and 43 which are hinged together at 44 and 45. By having the collar so hinged it can readily be disposed about the arbor 32. After the collar is so disposed it is drawn tightly about the shoulder 40 on the machine and sealed thereto by a sealing material 46 which may be of cork, felt or similar sealing material. A locking clamp 47 is secured to the section 43 and is provided with an aperture which projects over a pin 48 on section 41 to retain the two sections in related position, locked about the shoulder 40 of the machine. A notch 49 is provided in each of the sections 41 and 43 which, when the collar is in locked position, produces a rectangular aperture the edges of which project within a slot 51 of a terminal connector 52 with which a discharge hose 53 is engaged.

The hose 53 may project out of the building or into any suitable device and I have herein illustrated a dust arrester 54, to which the hose 53 is attached, for separating the residue and for discharging the cleaned air back into the room. A container 55 of the arrester 54 collects the residue which may be emptied from time to time. In this manner the machine may be employed on the floor of the garage without any dust or grit being blown around the room which would otherwise occur in view of the pressure set up by the blower 25.

Referring to Figs. 4 and 5, I have illustrated a further extension of the invention as applied to a grinding operation. It will be understood that after the boring operation the cylinders are so rough that it is necessary to grind them to produce a high polish to prevent the wearing of the pistons and rings which contact with the cylinder walls. The structure herein shown and described is similar to that found in the co-pending application of myself and Fred Kern, Serial No. 512,719, filed January 31, 1931 with the exception that the air is forced through the engine by positive means rather than sucked therefrom by a vacuum system. The advantage of this pressure system has been pointed out hereinabove.

Referring to Fig. 4, a collar 56 is disposed in continuation of the engine cylinder, attached to a manifold 57 which is clamped on the top of the engine block by suitable clamping means 58. A cover 59 is disposed upon the top of the collar 56 having an operating shaft 61 extending therethrough provided with a bifurcated extension 62 in which a collar 63 is swingably mounted having slots 64 therein which engage trunnions 65 on a honing tool 66. Suitable springs 67 and 68 retain the weight of the honing tool and the driving motor attachable through a hexagon end 69 on the shaft 61. The shaft having the sealing means 71, the tool and the collar are more particularly described in my above mentioned co-pending application. It will be noted, when adjustment is to be made of the honing tool, that the shaft is reversely turned to disengage the trunnion 65 from the slot 64 to have the cover 59 removed so that the adjusting head of the tool 66 is available to the operator. When a vacuum system was employed, the air was no longer drawn through the engine block and any dust, dirt or residue could fall within the block while the operator set off the adjustment on the tool.

In the present construction, when the cover is removed from the collar 56 and adjustment is made to the tool, a strong blast of air is blowing upwardly out of the engine block to prevent any of the residue, dust or grime from falling within the engine block when disturbed by the operator. When the collar and shaft are attached as illustrated in the figure, the air is passed out through the manifold 57, the hose 53 into the air arrester 54 or other suitable container.

In Figs. 6 and 7, I have shown a sealing means which I may employ in lieu of the rubber balls 21 above referred to. I have illustrated a spring steel strap 72, the ends of which are in overlapping relation and over which a rubber element 73 may be stretched. The rubber is of such quality and thickness as to be readily stretchable by the bias in the spring strap 72 so that the spring strap may be reduced in diameter through an application of pressure on the exterior surface of the rubber and inserted within the cylinder to have the metal band expand to force the rubber into intimate engagement with the side of the cylinder wall. In this manner, the sealing element may be employed on any size of cylinders employed on passenger automotive vehicles, to be expanded from substantially a two inch to substantially a 3½ inch diameter.

In Fig. 6, I have illustrated the element as having a full face to be employed in holes 14, 15 and 16, while in Fig. 7, I have illustrated an aperture 74 as being provided in the central portion of the face to be employed with the clamping rod 22 and the cylinder 13. The rubber may be stretched to have the rod pass through the aperture 74 and thereafter the spring strap 72 may be pressed together to reduce the diameter beyond that of the cylinder so that it may be inserted therein, after which the release of the strap causes it to expand and force the rubber into engagement with the cylinder wall.

While I have specifically mentioned rubber balls and the device illustrated in Figs. 6 and 7 as being means for sealing the cylinders, it is to be understood that any type of means such as wedges, ovals and the like may be utilized, preferably constructed to be disposed below the top of the engine block so that it may be dressed or machined without any danger of the residue falling within the engine.

It will be noted that, when machining cylinders of an engine block either by a boring operation or a grinding operation, none of the residue produced thereby will fall within the block onto the crank shaft or the pan because of the air pressure system set up within the block by the blower. The air introduced to the block is preferably strained so that no dust is drawn into the blower and forced into the block where it would collect upon the oil film on the inner surface of the engine. All of the holes are substantially sealed so that practically all of the air is forced out of the cylinder being machined and away from the block and tool. I preferably employ a dust arrester connected to the outlet conduit for freeing the air from the residue so that the system may be employed anywhere without disturbing the air in the room. By providing an internal air pressure in the engine no residue whatsoever can enter the internal parts thereof in view of the outflow of air at any such place of entrance. While I have particularly specified engine blocks as being the primary use of the system, it is to be understood that similar apparatus, that is to say, apparatus wherein machining is done where the residue could fall within the apparatus, could have the system adapted to be successfully employed therewith. Accordingly, the method is not to be presumed to be limited to engine blocks alone, although developed for that particular purpose.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. The combination with an engine block having a plurality of cylinders, means for substantially sealing the block at all points except two of the cylinders, means for introducing air into said block in one of said cylinders which is vented out of the remaining open cylinder during the machining of said open cylinder.

2. The combination with an engine block having a plurality of cylinders, means for substantially sealing the block at all points except two of the cylinders, propelling means connected to one of the cylinders for introducing a flow of air through the block and out the open cylinder during the machining of said open cylinder.

3. The combination with an engine block having a plurality of cylinders, means for substantially sealing the block at all points except two of the cylinders, propelling means connected to one of the cylinders for effecting a flow of air through the block and out the open cylinder during the machining of said open cylinder, and means for conducting the air away from the cylinder and the machining means.

4. The combination with an engine block having a plurality of cylinders, means for substantially sealing the block at all points except two of the cylinders, propelling means connected to one of the cylinders for producing a flow of air through the block and out the open cylinder during the machining of said open cylinder, means for conducting the air and residue away from the cylinder and the machining means, and an air arrester connected to said conducting means for separating the residue from the air.

5. The combination with an engine block having a plurality of cylinders, means for substantially sealing said block at all points except at two of the cylinders, air propelling means for producing a pressure within the block through one of the cylinders which causes a material flow of air through the remaining cylinder during the machining of said remaining cylinder, and means for sealing the end of the cylinder being machined having an outlet from which the air is conducted away from said cylinder.

6. The combination with an engine block having a plurality of cylinders, means for substantially sealing said block at all points except at two of the cylinders, air propelling means for producing a pressure within the block through one of the cylinders which causes a material flow of air through the remaining cylinder during the machining of said remaining cylinder, an element for sealing the end of the cylinder being machined having an aperture through which the air is conducted away from the cylinder, and an air arrester for separating the residue from the air conducted therefrom.

7. The method of machining the cylinders of an engine block, which includes the steps: of substantially sealing the block at all points except two cylinders which are in communication through the block so sealed, producing a pressure of air in the block through one of the cylinders, and producing a material flow of air outwardly through the cylinder being machined to prevent the refuse produced thereby from falling within the block.

8. The method of machining a cylinder of an engine block which includes the steps; of substantially sealing the block at all points except the cylinder being worked upon; of producing a pressure of air within the cylinder to provide a continuous and material flow of air out of the cylinder being machined, and of conducting the air and the residue from the cylinder away from the block.

9. The method of machining a cylinder of an engine block, which includes the steps; of substantially sealing the block at all points except the cylinder being worked upon; of producing a pressure of air within the cylinder to provide a continuous and material flow of air out of the cylinder being machined, of conducting the air and the residue from the cylinder away from the block, and of thereafter separating the residue from the air.

10. The method of machining a cylinder of an engine block, which includes the steps of substantially sealing the engine block at all points except the cylinder being worked upon; of introducing air under pressure into the cylinder; and of machining the cylinder while air is flowing outwardly therethrough.

11. The method of machining a cylinder of an engine block, which includes the steps, of substantially sealing the engine block at all points except the cylinder being worked upon; of introducing air under pressure into the cylinder; of filtering said air before such introduction; of machining the cylinder while air is flowing outwardly therethrough, and of conducting said air away from said cylinder.

12. The combination with an air supply system which causes an outflow of air through a cylinder which is being machined, of a machining device, a flexible collar disposed about the machining portion of said device for sealing the device in extension of said cylinder, and air conducting means associated with said flexible collar for conducting the air away from said device.

13. The combination with an air conducting system for producing an outflow of air to a cylinder being machined, of a device for machining said cylinder, anchoring means for said device extending through an adjacent cylinder, and means for sealing said anchor means in said device comprising an expansible rubber disc having an aperture therein which extends over said anchor means and which is expansible to engage the wall of the adjacent cylinder.

KIRKE W. CONNOR.